No. 779,749. PATENTED JAN. 10, 1905.
C. W. TINLING.
ANTISEPTIC FEEDING BOTTLE.
APPLICATION FILED APR. 30, 1904.
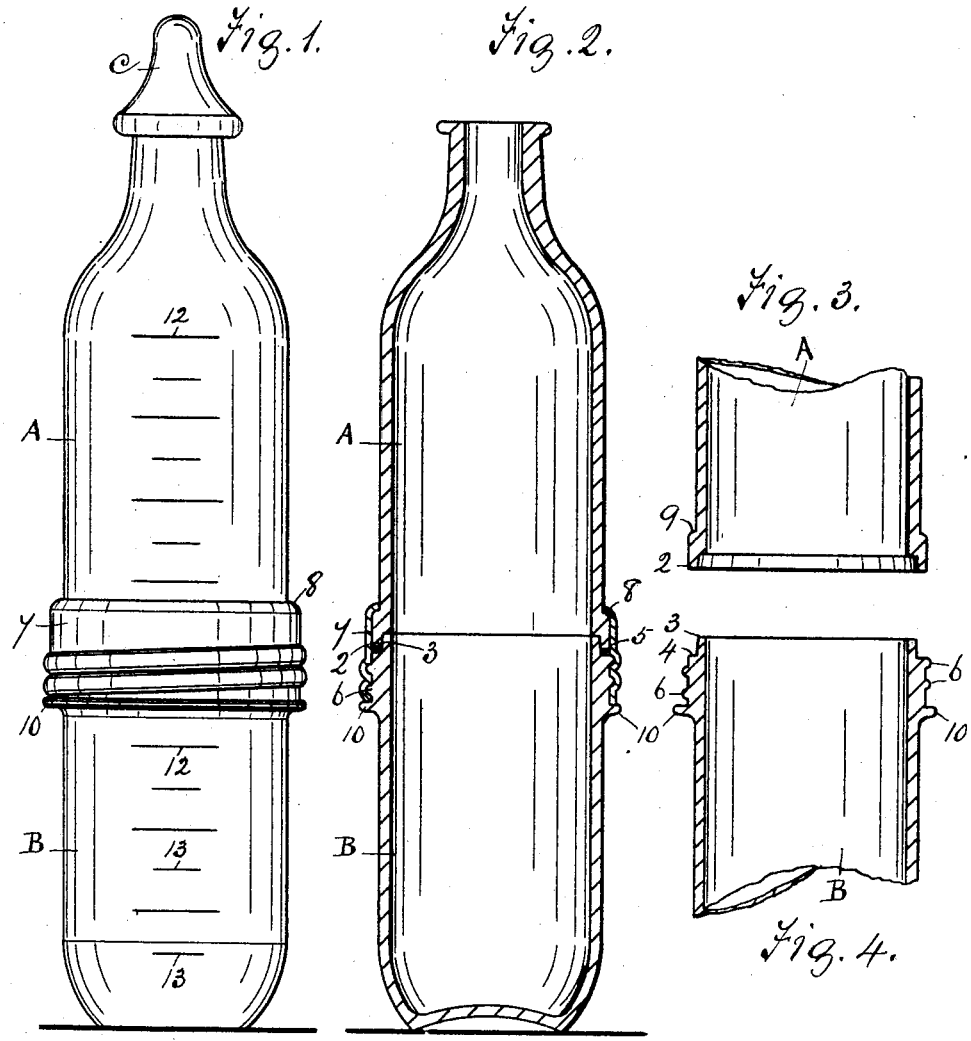
Witnesses.
Wm. Tocher
A. E. Young
Inventor.
Charles W. Tinling
By John H. Hendry, Atty.

No. 779,749.

Patented January 10, 1905

UNITED STATES PATENT OFFICE.

CHARLES W. TINLING, OF HAMILTON, CANADA.

ANTISEPTIC FEEDING-BOTTLE.

SPECIFICATION forming part of Letters Patent No. 779,749, dated January 10, 1905.

Application filed April 30, 1904. Serial No. 205,682.

*To all whom it may concern:*

Be it known that I, CHARLES W. TINLING, a citizen of Canada, and a resident of Hamilton, in the county of Wentworth, in the Province of Ontario, Canada, have invented new and useful Improvements in Antiseptic Feeding-Bottles, of which the following is a specification.

My invention relates to improvements in antiseptic feeding-bottles for infants; and it consists of a round bottle in portions fitting transversely and held together by means of a screw-threaded collar on the joining part of the component portions of the bottle.

The objects of my invention are, first, to provide an antiseptic feeding-bottle in portions united together as one and adapted to be disunited or detached one portion from the other for cleaning and purifying purposes; second, to provide an antiseptic feeding-bottle the interior of which is smooth and free from protuberances or obstructions and adapted to facilitate the reach of a person to the full extent of the interior for cleansing and antiseptic purposes; third, to produce a round bottle that is proportionate and pleasing to the eye and to the touch, and, fourth, to afford facilities for expeditiously separating and uniting the portions of the bottle and securing the same together. I attain these objects by the mechanism illustrated in the accompanying drawings, in which—

Figure 1 is an elevation of the antiseptic feeding-bottle in its completeness. Fig. 2 is a sectional elevation of the same, showing the interior and the transverse joining together of the component parts thereof. Fig. 3 is a detail sectional elevation of the joining part of the upper portion of the bottle. Fig. 4 is a detail sectional elevation of the joining part of the lower portion of the bottle. Fig. 5 is a sectional elevation of the detached metallic collar; and Fig. 6 is a sectional elevation of the rubber ring, which when in position rests on the annular shoulder of the lower said part of the bottle and between said shoulder and the lower annular rim part of the upper said part of the bottle.

Similar characters refer to similar parts throughout the several views.

The accompanying drawings represent the bottle as divided into two portions, the upper portion being indicated by A and the lower portion of the bottle by B. Said portions are round and preferably of parallel form, as shown. The flanged neck of the bottle is provided with an ordinary rubber nipple C. The transverse joining part of the upper portion of the bottle is slightly enlarged or increased in diameter and has an annular flange 2. The joining part of the lower portion of the bottle is also enlarged to the size of said upper joining portion and has an annular recess or grooves 3 to receive said annular flange 2. Between the bottom of the flange 2 of the upper portion of the bottle and the shoulder 4 of the lower portion of the bottle is a rubber washer 5, non-contiguous to the interior of the bottle for antiseptic purposes, said parts fitting snugly together and waterproof.

The enlarged joining part of the lower portion of the bottle has a suitable screw-thread 6 to receive the screw-threaded collar 7, which has an annular flange 8 to fit onto the annular shoulder 9, which is formed by the said enlargement of the joining part of the upper portion of the bottle.

The lower portion of the bottle has an annular rounded bead 10 immediately below the thread 6. Considering that the bottle is preferably made of glass, the bead 10 is important in that when screwing the collar 7 to position the person's hand is free from contact with any possible undesirable protuberance on the thread 6, and especially so on the lower part of the thread. The lower part or termination of most threads of this nature are very sharp and cutting. Therefore the bead 10 protects the hand in a most satisfactory manner.

When the metallic collar 7 is screwed to position, the portions of the bottle are brought tightly together on the rubber washer 5. Then the bottle is waterproof.

It will be observed that the interior of the bottle is perfectly straight and smooth, and when the portions are apart and separated the interior of the bottle is within easy reach for antiseptic or cleaning purposes. The series of transverse lines 12 on one side of the bottle are lines raised or sunk, as is desirable, and denote ounces or the like, and the shorter transverse lines 13, between the lines 12, denote half-ounces, all of which may be indicated on the bottle, if desirable, commencing at the bottom with one-half ounce, as shown, or with the one-ounce mark, as the case may be.

The feature of the transverse lines 12 and 13, together with the neck and nipple part C of the bottle, is already in use on various kinds of bottles. Therefore I do not specifically claim the same.

What I claim as my invention, and desire to secure by Letters Patent, is—

An antiseptic feeding-bottle consisting of two equal portions transversely joined and united together as one, the joining part of each portion enlarged to fit one into the other, a washer between said joining parts non-contiguous to the interior of the bottle, a thread on one of said enlargements, an annular bead at the termination of the thread to protect the hand, means to unite and to disunite the portions, and a neck extending outwardly from one portion.

CHARLES W. TINLING.

Witnesses:
 J. M. DICKSON,
 H. HENDERSON.